Nov. 17, 1964

A. HANSSON ETAL 3,157,474

PREPARATION OF EXPANDABLE LAMINATE
STOCK AND BILLET THEREFOR

Filed Aug. 7, 1959

INVENTORS
ANTS HANSSON
BY CURTIS E. MAIER

Mason, Porter, Diller & Stewart,
ATTORNEYS

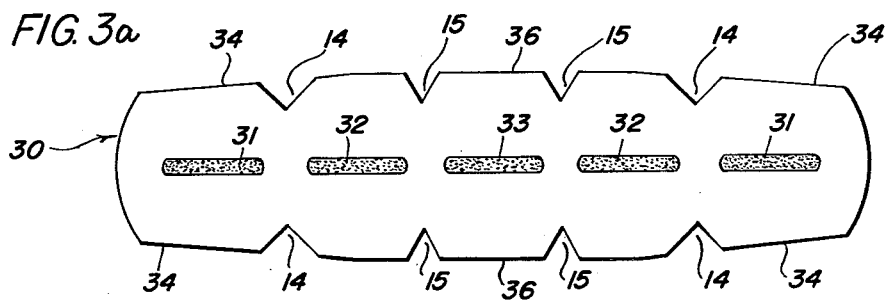
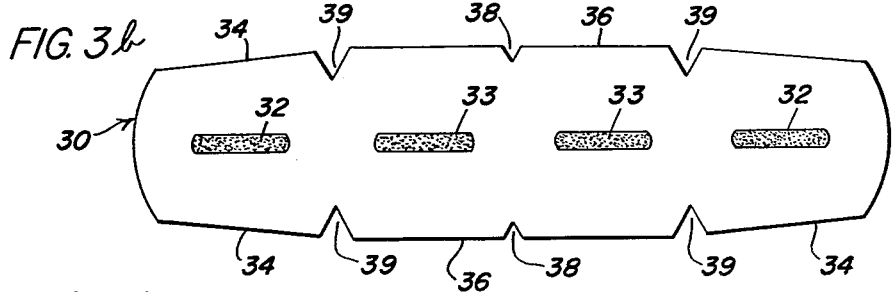
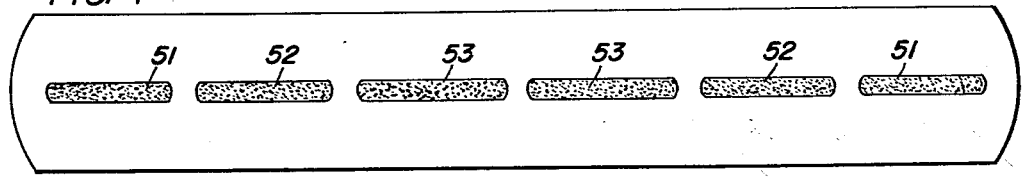
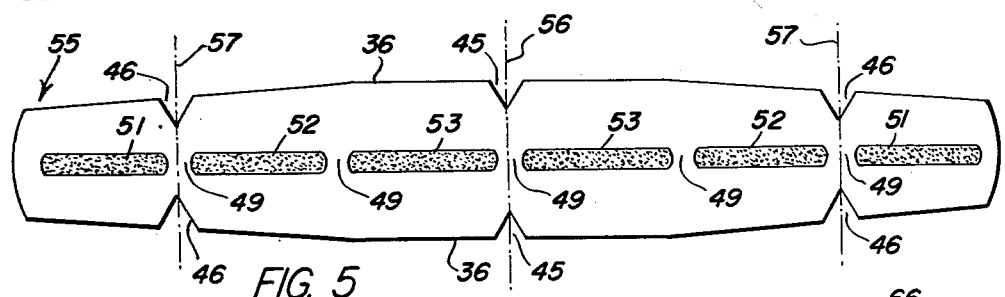
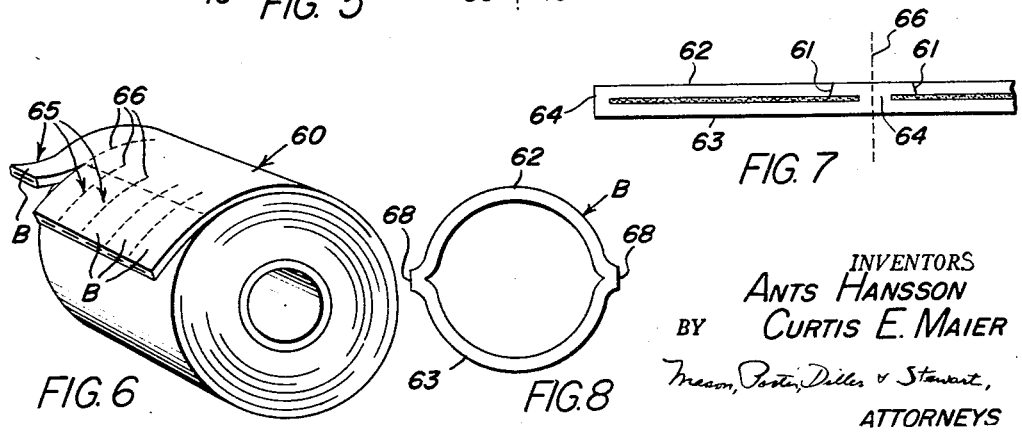

United States Patent Office 3,157,474
Patented Nov. 17, 1964

3,157,474
PREPARATION OF EXPANDABLE LAMINATE
STOCK AND BILLET THEREFOR
Ants Hansson, Evanston, and Curtis E. Maier, Riverside,
Ill., assignors to Continental Can Company, Inc., New
York, N.Y., a corporation of New York
Filed Aug. 7, 1959, Ser. No. 832,282
31 Claims. (Cl. 29—187)

In the making of tubing by the preparation of expandable stock in the form of strips having surface laminations separated by anti-welding layers and with the laminations connected by integrating material at the edge of such layers, it is economical to make tubes of small diameter by preparing a strip which is multi-wide, that is which has a number of longitudinally extending anti-welding layers across its width, of which each has surface laminations at each side thereof, and with integrating or spacer material interposed between adjacent layers and extending along the length of the strip. For this purpose, a billet can be prepared in various ways, including those of the Valyi et al. Patent 2,375,334: such a billet has longitudinal internal channels which contain an anti-welding material for providing a like number of cores which are extended in length essentially in proportion to the extension of the billet material itself, during the course of rolling operation for reducing the billet to the multiwide strip.

As indicated, such billets may be prepared by casting ingots having internal discontinuities as longitudinal channels which may be filled during casting or in a subsequent operation with a resist or anti-welding material which serves as a core during the illustrative rolling to reduce the thickness of the ingot to that of the strip; or by rollbonding or brazing of slabs to close like channels preformed in one or both of the slabs, preferably with a like filling thereof before or after the joining of the slabs.

In practice, it has been found that there is a lateral spreading or widening of the billet as it is rolled. Generally, the spreading is not uniform throughout the thickness of the billet. The spreading of the surfaces contacted by the rolls is low, due to the frictional restraint, for example, exercised by a roll. The spreading at the median plane has been found greater than that at the surface planes. The spreading at the successive planes from the surface toward the central or median plane varies with the rolling schedule: usually, with a heavy reduction per pass, the spreading is greatest at or near the central plane, somewhat dependent upon the thickness of the billet and the ductility of the metal; while at less reduction per pass, the greatest spreading is closer to the surface planes. Correspondingly, the differential spreading of the core varies with the rolling schedule. With solid metal, this causes no grave difficulty. When it is sought to make tubes which are within close tolerances of internal diameter after expansion, however, this lateral spreading is found to cause differential widening of the cores when these are initially of identical dimensions in the billet. In general, the spreading is relatively greater during hot-rolling than during cold-rolling: and is greater with heavy reduction per pass than when the same total reduction is accomplished by a greater number of passes with a lesser percentage reductive in each. In particular, when the original billet is of rectangular cross-section, and contains a number of the discontinuities provided by channels of like widths and filled alike with the antiwelding or resist material, the rolling operation produces a strip in which the resist residue layers adjacent the lateral edges are wider than those nearer the center of width: and therewith the tubes obtained by expanding the lateral portions of the multi-wide strip have greater internal diameters than those from intermediate and central portions. When close tolerances are demanded, e.g. for the production of container bodies which must have a standard height for a given volume and which for economical production must be handled by automatic machines for forming end flanges and applying container ends under conditions of close tolerance of the machine parts for attaining desirable end closures, the errors thus arising demand some sort of compensation or redressing.

It has been found that close conformance to prescribed tolerance of individual widths, of the several regions and the resist layers therein, can be attained by preparing the billet so that like lateral expansions or widenings are produced for such regions. Specifically this can be accomplished by having lesser billet material at the lateral regions than at central regions.

An object of the invention is the preparation of a billet having multiple internal discontinuities extending lengthwise thereof, and having successively lesser billet material sections from its center of width toward its edges.

Another object is the preparation of such a billet having external longitudinal grooves of successively greater sections from the center of width toward the lateral edges.

Another object is the preparation of such a billet having a differing proportion of metal per unit width at a point near the center of width than at a point nearer the lateral edge, the greater amount of metal being present adjacent the center of width.

Another object is the preparation of such a billet, in which the transverse cross-section is arched or crowned so that the billet is thicker at its center of width than at its lateral edges.

A further object is the method of preparing and rolling such a billet so that the strip produced therefrom has the widths of the individual core or resist layers existent therein in substantially identical ratios to the widths of the original channels.

With these and other objects as features in view, as will appear in the course of the following description and claims, illustrative practices are shown in the accompanying drawings, in which:

FIG. 3a is a further perspective view of a part of a billet according to a fifth embodiment of the invention;

FIG. 3b is a further perspective view of a part of a billet according to a sixth embodiment of the invention;

FIG. 4 is an end view of a billet according to a seventh embodiment;

FIG. 5 is an end view of a billet according to an eighth embodiment;

FIG. 6 is a perspective view of a coil of the strip produced, and showing its severance;

FIG. 7 is an end view of part of the strip on a larger scale;

FIG. 8 is an end view of a tube prepared from a part of the strip.

Figure 1:
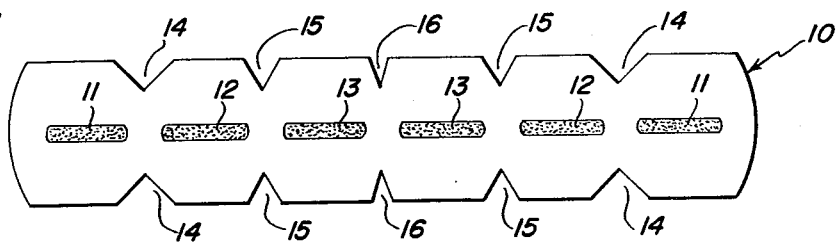
FIG. 1 is an end view of a billet according to a first embodiment of the invention.

In FIG. 1, the billet 10 has a generally rectangular sectional outline, and has six internal longitudinal discontinuities provided by six channels 11, 12, 13 containing an anti-welding or resist material. Such an ingot may illustratively be prepared by casting aluminum or iron alloys about core members containing the resist, or about core members which are later removed and the channels then filled with the resist material; or by casting in the solid and machining holes by boring and broaching operations, for receiving resist material; or by roll-bonding two slabs with one or both slabs having grooves for forming the channels, with filling of the grooves or channels before or after the roll-bonding.

In practice, roll reduction of a rectangular billet causes a lateral spreading, whereby the channels are differentially widened: that is, assuming that the channels 11, 12, 13 are originally of identical dimension transversely of the billet, the rolled strip product therefrom will have the residues of channels 11 wider than those of channels 12, and these in turn will be wider than those of channels 13. The amount of the widening is dependent upon the size and material of the billet, the temperature and other conditions of rolling including the reduction per pass, the rolling lubricant, and other recognized factors, along with the core dimensions relative to those of the billet.

According to this invention, in FIG. 1, the billet 10 is also provided with a plurality of grooves extending longitudinally, illustratively in the upper and lower surfaces in aligned pairs. With the six channel cores shown, and five pairs of such grooves, the grooves 14 nearest the edges have a greater cross-section than the grooves 15 nearer the center of width, and the grooves 16 at the center have the least cross-section. In the illustrative form, the grooves are of the same depth, but of differing inner corner or root angles. When the billet so prepared is rolled, the rolls act to smooth down the metal toward plane top and bottom surfaces. Therewith the lateral flow of metal causes the grooves 16 at the center to become closed first, and thereafter lateral spreading of the metal over the central region is accompanied by lateral spreading of the core channels 13. In turn, the grooves 15, and then 14 are closed; and therewith there is little lateral spreading of the core channels 11 at the edges until the grooves 14 are closed. With the given billet material, and cross-section of the grooves, this can be accomplished, for example, near the completion of the rolling passes, so that the normal greater spreading at the successive outward channels with plane surfaces on the billet is now effective to bring the strip, at the end of the rolling schedule, to a condition at which the early greater spreading at the center is compensated by the later greater spreading toward the edges, and the final strip has the residual layers of resist essentially the same width within prescribable minor tolerances.

Figure 1A:
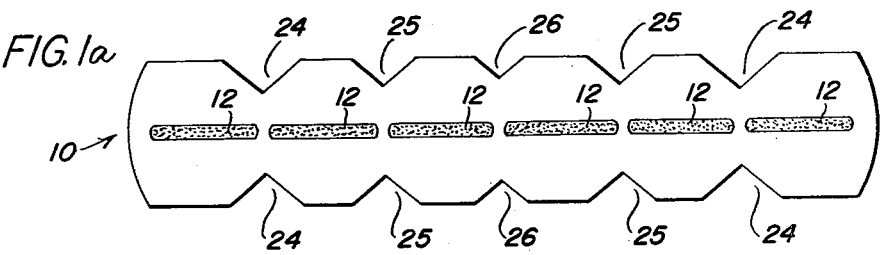
FIG. 1a is an end view of a billet according to a second embodiment of the invention.

In the embodiment in FIG. 1a, the ingot 10 is of uniform general thickness, as in FIG. 1, and has the internal discontinuities 12 of identical width. The longitudinal external grooves 24, 25, 26 have the same root angle, illustratively 40 degrees, and are of differing depths from the ingot surfaces, with the depth increasing from the central grooves 26 to the lateral grooves 24. During rolling, this differential provides a compensation for the tendency of the cores to spread differential, with a greater spreading at the lateral edges of the ingot than at the center of width.

Figure 2:
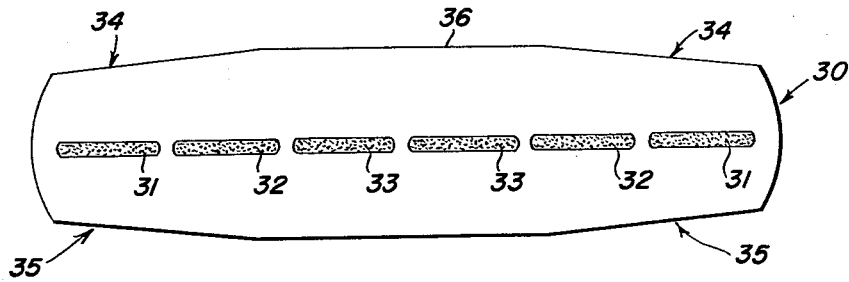
FIG. 2 is an end view of a billet according to a third embodiment of the invention.

In the form of FIG. 2, the billet 30 has the internal cores 31, 32, 33 of anti-welding material, being present in longitudinal channels of identical cross-sections and spaced in a mid-height plane across the width of the billet. In this form, the general cross-sectional outline is not rectangular; but the upper and lower surfaces convergently taper toward the lateral edges illustratively with the planes 34, 35 being symmetrical relative to the plane of the cores 31, 32, 33 and also symmetrical across the upright central plane. Central plane surfaces 36 are parallel to one another and symmetrical to the mid-height plane, for initial contact with the reduction rolls, and assist in procuring a symmetrical reduction of the billet into the strip. The combined width of the surfaces 36, from outer edge to outer edge should be less than the like width of four cored units for a billet having an even number of cores; and less than the like width of three cored units for a billet having an odd number of cores. That is, the parallel surfaces portions 36 span the center of width of the billet but do not extend laterally from the center to a point beyond the second integral outwardly displaceable metal connection interposed in the plane of the cores. The surfaces 36 in the illustrated form have their lateral edges opposite mid-points of the widths of the cores 33. In this form, the reduction begins at the center of width, that is, at surfaces 36, and hence lateral displacement of metal and core material is initially at the space between the innermost cores 33 and over parts of the widths of these cores; gradually extending toward the lateral edges during the course of the thickness reduction. The billet 30 can be rolled lengthwise for all passes: during subsequent longitudinal rolling, the outer cores are widened differentially to the inner cores by the lateral spreading effect: and the final strip has core residues of the same width.

Figure 3:
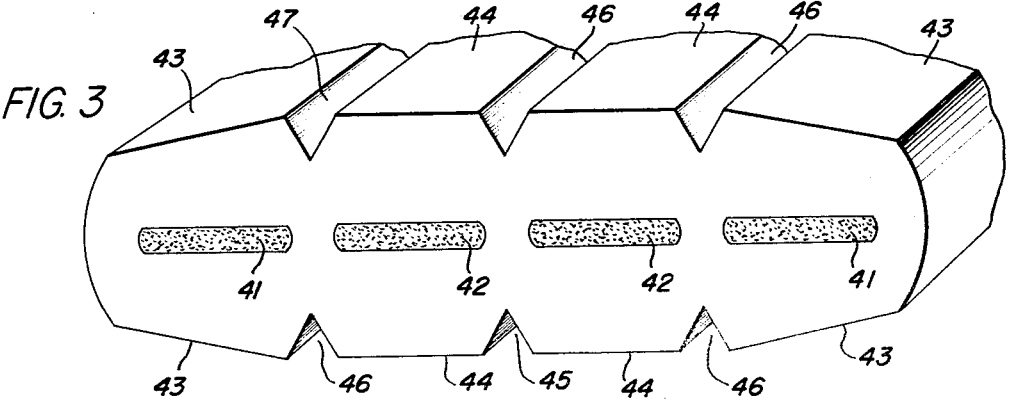
FIG. 3 is a perspective view of a part of a billet according to a fourth embodiment of the invention.

In the form of FIG. 3, the internal cores 41, 42 of anti-welding material are of identical cross-section and spaced laterally at mid height. The metal section per unit width of the billet 40 is greater, adjacent the center of width, by having the upper and lower surfaces 43 arched or crowned as in FIG. 2, but being curved rather than presented as a succession of plane surfaces across the width. The upper and lower surfaces 44 are flat and parallel, as with FIG. 2; illustratively extending past the center grooves 45 and terminating at the grooves 46 which are aligned with the integral metal connections at the outward edges of the central two cores 42 of the illustrated four-core multi-wide billet. In this form, the effect of the crowned surfaces in compensating differential lateral spread is coordinate with the effect of having longitudinal external grooves 45, 46, 47 which here are illustratively of the same depth and cross-section. The grooves 47 nearest the margins are illustratively outside of the cores 41.

In the form of FIG. 3a, the ingot 30 is contoured as in FIG. 2, and also has grooves 14, 15 of the same depth but with root angles which increase from the center toward the lateral margins, as in FIG. 1. The core channels 31, 32, 33 are of the same size and shape, five being illustratively shown. Thus there are two pre-disposed conditions by which compensation of variant spreading is attained. The flat parallel surfaces 36 permit accurate entry to the rolls at the first pass. The early reduction or reductions have a compensation for excessive spreading during the closing of the central grooves 15, and later reduction or reductions by the closing of the lateral grooves 14, of greater angle and cross-section. Therewith, also, the crowned or contoured shape by the inclined planes 34 affords a greater initial spreading at the center channels 33, and a later greater spreading at the lateral channels 32, so that the total of compensatory effects results in the widths of resist residue in the final strip being of the preselected dimensions; e.g. all having the same width.

In the form of FIG. 3b, the ingot 30 has four cores of identical cross-sections, and the ingot surfaces are contoured with the planes 34, 36 as in FIGS. 2 and 3. The grooves 38, 39 have the same root angle, but are of different depths, the outer groove 38 being shallower than the end groove. The action is as with FIG. 3a.

FIGS. 3, 3a and 3b show the employment of two methods of effecting compensation for lateral spreading, wherewith each contributes its effect and neither demands major removal of metal with the possibility of distortion arising therefrom. Therewith ingots can be cast with internal channels, and then the ingot prepared for a selected rolling schedule by the contouring and by the use of grooves of predeterminable angle, depth and cross-section.

In the practice illustrated in FIG. 4, the billet 50 has the internal cores 51, 52, 53 of anti-welding material which are shown as of the same thickness but of differing widths: the difference of width is exaggerated in FIG. 6, for clarity of disclosure. Due to the lesser dimension of the billet material extending from side to side, above and below, the outer cores 51 compared to the billet material at the cores 52 and the cores 52 in turn being narrower than the innermost cores 53, the result of rolling the billet 50 is that a greater spreading per unit of original width occurs for each successive unit width from the center toward the edges, and strip produced can have exactly compensated widths of the residual layers from the cores 51, 52.

In the practice of FIG. 4, satisfactory strips for tubing of relatively great tolerance of diameter can be made; but the difference of widths of the channels for the cores 51, 52, 53 requires that these be closely proportioned relative to one another, and based on a given rolling schedule. When it is found desirable to change the rolling schedule, a new scale of differences in core widths is usually needed.

As shown in FIG. 5, a part of the compensation for differential spread can be effected as in FIG. 4, and a part by the means in FIGS. 1–3. For example, a group of ingots or other billets can be made up as in FIG. 4, and then exact compensation for final core residue width effected by surface contouring, the contouring only being varied as the rolling schedule is changed. In FIG. 5, the billet 55 has the cores 51, 52, 53 as in FIG. 4, with the cores being successively wider from the edges toward the center of width. A slight crowning is present, as in FIG. 2, with the central surfaces 36 as parallel planes, as before, and the lateral surfaces 34, 35 as outwardly convergent planes. The longitudinal grooves 45, 46 can then be cut opposite the metal spacer portions 49 present in the plane of and between adjacent cores. For example, if the cores 53 produce residue layers in the strip which are too wide for the selected width relations of the cores 53, 52 in preparing the billets, with or without the crowning at surfaces 34, 35, grooves 45 can be provided at the central upright longitudinal plane designated by line 56 to effect compensation for this. If the edge cores 51 provide an excessive width of residue which is not compensated by the crowning, grooves 46 at the upright longitudinal planes designated by lines 57 may be employed.

The compensation by the grooves 14, 15, 16, 45, 46 in FIGS. 1, 3 and 5, and by the crowning in FIGS. 2, 3 and 5, depends upon the cross-sectional area or areas by which the metal of the billet is reduced: thus, by successively greater or lesser depths of grooves 14, 15, 16, 45, 46 in successive billets of a series, the compensation can be brought to exactness within prescribed tolerances: and practice with prior billets enables the operator to predetermine core width, crowning, and groove locations and cross-sections which for given metals, billet sizes, and rolling schedules, will give controls within the tolerances prescribed.

The strip 60, FIG. 6, produced from the billets 10, 30, 40, 50, 55 has an over-all width greater than that of the billet itself, the increment being determined by the ductility of the billet metal, during the successive passes, the effect of the anti-welding cores, the temperature at each rolling pass, the behavior of the reduction rolls, the degree of reduction for the particular rolling pass, and the other variables. The schedule provides the strip 60 which has, FIG. 7, the residues 61 of the core material of essentially identical widths and each extending along the strip between upper and lower metal laminations or layers 62, 63 with each pair of laminations integrally connected by metal 64 at the edges of the resist residues.

Such a strip can be slit into individual narrow strips 65 along cuts 66 in the integrating metal connections 64 between two adjacent core residues: and then severed into individual blanks B, by transverse cuts 67. Such a blank 66 can then be opened out or expanded into a tube as shown in FIG. 8, by spreading and bending the laminations 62, 63 apart, with the metal connections 64 present as externally projecting ribs 68.

It will be understood that the illustrative forms are not restrictive, and that the invention can be practical in many ways within the scope of the appended claims.

What is claimed is:

1. The method of controlling the widths of each of a plurality of laterally spaced longitudinally extending anti-welding core material residues in the making of multi-wide laminate expandable strip stock, which comprises preparing a metal billet having a multiplicity of laterally spaced internal longitudinally extending channels with anti-welding core material present therein and wherein each channel is surrounded with metal, each channel and metal therearound constituting a unit region of cross-section, said billet having a greater amount of metal between its upper and lower surfaces at unit regions near the center of width than between said surfaces at unit regions adjacent the lateral longitudinally extending edges, then rolling the billet for reducing its thickness to that of the strip to be made and therewith effecting a relatively greater lateral spreading of core materials in the channels adjacent the said lateral edges than in channels nearer the center of width and a relatively lesser lateral spreading of the billet metal at unit regions adjacent the said lateral edges than at unit regions nearer the center of width, said spreadings of core materials and metal being effective to compensate one another, and withdrawing the product as a strip of uniform thickness and making a multiplicity of core material residues spaced across its width and with the said residues being essentially of the same width.

2. The method as in claim 1, in which the step of preparing a metal billet includes providing the billet with a plurality of external longitudinal grooves in a surface thereof for contact with a reducing roll.

3. The method as in claim 2, in which the step of preparing a metal billet includes placing said grooves in aligned pairs, the members of each pair being in opposite surfaces of the billet.

4. The method as in claim 3, in which the step of preparing a metal billet includes forming said grooves which have cross-sections which increase in area from near the center of width of the billet toward its edges.

5. The method as in claim 4, in which the step of preparing a metal billet includes forming said grooves which have increasing inner root angles from near the center of billet width toward its edges.

6. The method as in claim 4, in which the step of preparing a metal billet includes forming grooves which have successively greater depth from the center toward the edge.

7. The method as in claim 1, in which the step of preparing a metal billet includes crowning the billet for forming the billet crowned with its lateral edges thinner than its center of width.

8. The method as in claim 7, in which the step of preparing a metal billet includes crowning by forming convergent surfaces extending from parallel surfaces at the center of billet width.

9. The method as in claim 7, in which the step of preparing a metal billet includes providing a billet also having a plurality of external longitudinal grooves in its crowned surfaces.

10. The method as in claim 9, in which the step of preparing a metal billet includes forming grooves having increasing cross-sections from the center of width toward the lateral edges.

11. The method of controlling the widths of each of a plurality of laterally spaced longitudinally-extending anti-welding core material residues in the making of multi-wide laminate expandable strip stock, which comprises preparing a metal billet having across its width a multiplicity of longitudinally extending unit regions of cross-section, each of said unit regions having a body of the anti-welding core material therein, the billet having metal surface portions extending integrally from one longitudinal edge to the other with the core material bodies of said unit regions located between said portions, each unit region having at its longitudinally extending edges material of said stock extending integrally from surface to surface thereof and providing spacers between adjacent bodies of core material, a first said unit region adjacent the center of width of the billet having a greater cross-section of metal than a second unit region adjacent a longitudinally extending edge thereof, then rolling the billet whereby to reduce its thickness and effect differential spreading of the metal and core materials in said first and second unit regions, and withdrawing the product as a strip when such spreadings have brought the core residue materials of said regions to the same width.

12. The method as in claim 11, in which the step of preparing a metal billet includes providing a billet wherein the width of the body of core material in the first region is greater than the width of the body of core material in the second region.

13. The method as in claim 12, in which during the step of preparing a metal billet the surfaces of the billet are contoured above a region adjacent a longitudinal edge, with the cross-section convergently tapering toward such edge.

14. The method as in claim 12, in which during the step of preparing a metal billet external longitudinal grooves are formed in alignment with the said spacers between said first and second regions.

15. The method as in claim 14, in which during the step of preparing a metal billet the surfaces of the billet are contoured, with the surfaces closer together above said first region than above said second region.

16. A billet for rolling to form a multi-wide expandable laminate strip having a plurality of laterally spaced, longitudinally extending internal anti-welding core residues, comprising a metal body having a multiplicity of internal longitudinally extending core channels for anti-welding material spaced across the width thereof and having each core channel surrounded with metal, each core channel and metal therearound constituting a unit region of cross-section, the body having flat parallel surfaces at the center of width and convergent surfaces extending from said parallel surfaces toward the lateral longitudinally extending edges of the billet, the body having a greater amount of metal between its upper and lower surfaces at unit regions near the center of width than between said surfaces at unit regions adjacent the lateral longitudinally extending edges.

17. A billet as in claim 16, in which the body has external parallel longitudinal grooves in said surfaces.

18. A billet as in claim 17, in which said grooves have root angles which are less at the center of width than adjacent the lateral edges of the billet.

19. A billet as in claim 17, in which said grooves have successively increasing depths and cross-sections from the center of width toward the lateral edges.

20. A billet for rolling to form a multi-wide expandable laminate strip having a plurality of laterally-spaced, longitudinally extending internal channels having therein anti-welding core residues of identical widths, comprising a metal body having a multiplicity of internal longitudinally extending channel cores of anti-welding material spaced across the width thereof, the body having metal portions between each two channel cores, the body having pairs of external longitudinally extending grooves with each groove of a pair located in a roll-engageable surface and opposite a said metal inter-channel portion.

21. A billet as in claim 20, in which said grooves have successively greater cross-sections from the center of width toward the lateral edges.

22. A billet as in claim 20, in which said grooves have successively greater root angles from the center of width toward the lateral edges.

23. A billet as in claim 20, in which said grooves have successively greater depths from the center of width toward the lateral edges.

24. A billet for rolling to form a multi-wide expandable laminate strip having a plurality of laterally spaced, longitudinally extending internal channels having therein anti-welding core residues, comprising a metal body having a multiplicity of internal longitudinally extending core channels for anti-welding material spaced across the width thereof, said internal channel cores being of successively decreasing widths from the center of width of the billet toward its lateral longitudinally extending edges.

25. A billet as in claim 24, in which marginal portions of the surfaces for contact with the forming rolls converge toward the lateral edges of the billet.

26. A billet as in claim 25, in which the body has external longitudinal grooves in the surfaces thereof.

27. A billet as in claim 24, in which the body has external longitudinal grooves located with alignment in pairs at the roll-contact surfaces of the billet.

28. A billet as in claim 24, in which the body has external longitudinal grooves of cross-sections successively increasing from the center of billet width toward its lateral edges in the forming rolls contacting surfaces thereof.

29. The method of controlling the widths of each of a plurality of laterally spaced longitudinally extending anti-welding core material residues in the making of multi-wide laminate expandable stock, which comprises preparing a metal billet having a multiplicity of laterally spaced internal longitudinally extending channels with anti-welding core material present therein and wherein each channel is surrounded with metal, each channel and metal therearound constituting a unit region of cross-section, said billet having a greater amount of metal between its upper and lower surfaces at unit regions near the center of width than between said surfaces at unit regions adjacent the lateral longitudinally extending edges, then reducing the thickness of the billet to form the laminate expandable stock and therewith effecting a relatively greater lateral spreading of core materials in the channels adjacent the said lateral edges than in channels nearer the center of width and a relatively lesser lateral spreading of the billet metal at unit regions adjacent the said lateral edges than at unit regions nearer the center of width, said spreadings of core materials and metal being effective to compensate one another, and withdrawing the stock as a strip of uniform thickness and having the core material residues essentially of the same width.

30. A billet for rolling to form a multi-wide expandable laminate strip having a plurality of laterally-spaced, longitudinally-extending internal anti-welding core residues, comprising a metal body having a multiplicity of internal longitudinally extending cores of anti-welding material spaced across the width thereof and having each core surrounded with metal, each core and metal therearound constituting a unit region of cross-section, the body having a greater amount of metal between its upper and lower surfaces at unit regions near the center of width than between said surfaces at unit regions adjacent the lateral longitudinally extending edges.

31. The method of controlling the widths of each of a plurality of laterally spaced longitudinally extending anti-welding core material residues in the making of multi-wide laminate expandable stock, which comprises preparing a metal billet having a multiplicity of laterally spaced internal longitudinally extending channels wherein each of the channels is surrounded with metal, each channel and metal therearound constituting a unit region of cross-section of the metal billet and each of the channels having anti-welding core material present therein, said preparing including forming the metal billet with a greater amount of metal between its upper and lower surfaces at unit regions nearer the center of width than between said surfaces at unit regions adjacent to the lateral longitudinally extending edges, pressing the upper and lower surfaces of the billet toward one another for reducing the thickness thereof with the simultaneous spreading of the unit regions adjacent the lateral longitudinal extending edges of the metal billet and the simultaneous spreading of the unit regions of the center portion of the metal billet with the resultant spreading of the anti-weld core material of the unit regions, said spreading of metal at the unit regions adjacent the edges being relatively greater than said spreading of metal at the unit regions of the center portion to compensate one another for forming longitudinal channels during said pressing of essentially the same width, and withdrawing the billet of reduced thickness as a strip of uniform thickness and having the anti-welding core material channels essentially of the same width whereby multi-wide laminate expandable stock is produced.

References Cited in the file of this patent

UNITED STATES PATENTS

| | | |
|---|---|---|
| 140,762 | Bolton | July 15, 1873 |
| 1,510,887 | Glynn | Oct. 7, 1924 |
| 2,008,626 | Murakami | July 16, 1935 |
| 2,169,937 | Wempe | Aug. 15, 1939 |
| 2,375,334 | Valyi | May 8, 1945 |
| 2,836,884 | Graham | June 3, 1958 |
| 2,983,994 | Johnson | May 16, 1961 |
| 2,986,810 | Brick | June 6, 1961 |
| 3,010,200 | Wilkins | Nov. 28, 1961 |

FOREIGN PATENTS

| | | |
|---|---|---|
| 464,817 | Great Britain | Apr. 26, 1937 |
| 21,467 | Great Britain | Nov. 24, 1892 |